US012714546B2

(12) United States Patent
Watcharotone et al.

(10) Patent No.: US 12,714,546 B2
(45) Date of Patent: Aug. 25, 2026

(54) DENTAL FLOSS

(71) Applicant: SUNSTAR AMERICAS, INC., Schaumburg, IL (US)

(72) Inventors: Supinda Watcharotone, Oak Park, IL (US); Leoncio Angel Gonzalez, Winfield, IL (US)

(73) Assignee: SUNSTAR AMERICAS, INC., Schaumburg, IL (US)

( * ) Notice: Subject to any disclaimer, the term of this patent is extended or adjusted under 35 U.S.C. 154(b) by 557 days.

(21) Appl. No.: 16/904,268

(22) Filed: Jun. 17, 2020

(65) Prior Publication Data

US 2021/0145555 A1 May 20, 2021

Related U.S. Application Data

(60) Provisional application No. 62/937,504, filed on Nov. 19, 2019.

(51) Int. Cl.
*A61C 15/04* (2006.01)

(52) U.S. Cl.
CPC .......... *A61C 15/041* (2013.01); *A61C 15/046* (2013.01)

(58) Field of Classification Search
CPC ............................ A61C 15/041; A61C 15/046
USPC .................................................. 132/321, 323
See application file for complete search history.

(56) References Cited

U.S. PATENT DOCUMENTS 5,209,251 A * 5/1993 Curtis .................... A61Q 11/00 132/321
5,413,127 A 5/1995 Hill
5,680,876 A * 10/1997 Hasham ................. A61Q 11/00 132/321
5,692,530 A * 12/1997 Bible .................. A61C 15/041 132/321
5,908,039 A 6/1999 Ochs et al.
5,989,709 A 11/1999 Kelmartin, Jr. et al.
6,238,605 B1 * 5/2001 Wimmer .............. A61C 15/041 264/129
6,270,890 B1 8/2001 Curtis et al.
6,539,951 B2 4/2003 Baillie et al.
7,171,971 B2 2/2007 Ochs et al.
7,174,903 B2 * 2/2007 Longoni ................ D02G 3/346 132/321
7,174,904 B2 2/2007 Ochs et al.
7,325,554 B2 2/2008 Ochs
8,132,579 B1 3/2012 Wien
(Continued)

FOREIGN PATENT DOCUMENTS

AR 068315 A4 11/2009
AR 068318 A4 11/2009
(Continued)

OTHER PUBLICATIONS

Colombian Office Action for Application No. NC2020/0014367, dated Dec. 11, 2023 (18 pages, including translation).
(Continued)

*Primary Examiner* — Nicholas D Lucchesi
(74) *Attorney, Agent, or Firm* — MICHAEL BEST & FRIEDRICH LLP

(57) ABSTRACT

A dental floss includes a first strand of material twisted with a second strand of material at a twist density of between 60 twists/meter to 300 twists/meter, inclusive.

20 Claims, 3 Drawing Sheets

(56) References Cited

U.S. PATENT DOCUMENTS

| | | | | |
|---|---|---|---|---|
| 8,316,629 | B2 * | 11/2012 | Huang | D02G 3/06 57/260 |
| 8,439,049 | B2 | 5/2013 | Lavrova | |
| 8,578,949 | B2 | 11/2013 | Kalbfeld et al. | |
| 8,651,116 | B2 | 2/2014 | Slack et al. | |
| 8,662,092 | B2 | 3/2014 | Kalbfeld et al. | |
| 2002/0104548 | A1 * | 8/2002 | Bhupendra Dave | D01F 8/12 132/321 |
| 2005/0053783 | A1 * | 3/2005 | Almeida Neto | D01F 6/12 264/103 |
| 2005/0161058 | A1 | 7/2005 | Yerushalmy | |
| 2005/0279377 | A1 | 12/2005 | Sarjeant | |
| 2009/0250076 | A1 | 10/2009 | Dolan et al. | |
| 2010/0294294 | A1 | 11/2010 | Wu | |
| 2012/0085365 | A1 * | 4/2012 | Cielo | A61C 15/046 132/323 |
| 2013/0000668 | A1 | 1/2013 | Madsen | |
| 2014/0366903 | A1 | 12/2014 | Chun et al. | |
| 2015/0240395 | A1 * | 8/2015 | Kim | D02G 3/28 57/344 |
| 2017/0312056 | A1 | 11/2017 | Kim et al. | |
| 2019/0231496 | A1 | 8/2019 | Kasakawa | |
| 2019/0390376 | A1 * | 12/2019 | De La Rue | D02G 3/448 |
| 2021/0145555 | A1 * | 5/2021 | Watcharotone | A61C 15/041 |

FOREIGN PATENT DOCUMENTS

| | | | | |
|---|---|---|---|---|
| AR | 068516 | A4 | 11/2009 | |
| BR | PI0905828 | A2 | 7/2011 | |
| BR | 102018013113 | A2 | 1/2020 | |
| CN | 202821690 | U | 3/2013 | |
| CN | 203138729 | U | 8/2013 | |
| CN | 206151612 | U | 5/2017 | |
| CN | 208552085 | U | 3/2019 | |
| EP | 764431 | A2 * | 3/1997 | A61C 15/041 |
| EP | 0759739 | B1 | 3/2004 | |
| EP | 0980678 | B1 | 6/2005 | |
| GB | 2467618 | A | 8/2010 | |
| JP | 2843962 | B2 | 1/1999 | |
| JP | 2006141456 | A | 6/2006 | |
| JP | 2009131695 | A | 6/2009 | |
| JP | 4348489 | B2 | 10/2009 | |
| JP | 2010214017 | A | 9/2010 | |
| JP | 5221280 | B2 | 6/2013 | |

OTHER PUBLICATIONS

Argentina Patent Office Action for Application No. 20200103209 dated Jul. 11, 2024 (12 pages including English translation).

* cited by examiner

DENTAL FLOSS

CROSS-REFERENCE TO RELATED APPLICATIONS

This application claims priority to U.S. Provisional Patent Application No. 62/937,504, filed on Nov. 19, 2019, the entire contents of which are incorporated by reference herein.

BACKGROUND

1. Field of the Disclosure

The present disclosure relates generally to dental floss. More specifically, the present disclosure relates to dental floss comprising a plurality of twisted strands.

2. Description of Related Art

Dental floss is generally used to remove food residue and other materials, especially from the gaps between neighboring teeth. Dental floss may be used by itself, for example by holding the ends of a length of dental floss with a user's hands and inserting the dental floss between the teeth. Dental floss may also be used with an implement known as a flosser, which generally includes a handle, a pair of spaced apart arms, and a floss retention device. In this case, a length of dental floss is strung between the spaced apart arms and the user flosses by holding the handle and inserting the dental floss between the teeth.

Existing dental floss may have difficulty in penetrating the gaps between neighboring teeth (interproximal access) and/or may have difficulty in removing the food residue and other materials once inserted, due at least in part to the shape and configuration of the dental floss. Accordingly, there exists a need for an improved dental floss.

SUMMARY

In one aspect, a dental floss includes a first strand of material twisted with a second strand of material at a twist density of between 60 twists/meter to 300 twists/meter, inclusive.

In another aspect, a flosser includes a body including a handle, a first arm, and a second arm spaced apart from the first arm, and a floss coupled to and extending between the first arm and the second arm. The floss includes a first strand of material twisted with a second strand of material at a twist density of between 60 twists/meter to 300 twists/meter, inclusive.

In another aspect, a method of manufacturing a dental floss includes twisting a first strand of material and a second strand of material together at a twist density of between 60 twists/meter to 300 twists/meter, inclusive.

In addition, other aspects of the disclosure will become apparent by consideration of the detailed description and accompanying drawings.

DETAILED DESCRIPTION

Before any aspects of the disclosure are explained in detail, it is to be understood that the disclosure is not limited in its application to the details of construction and the arrangement of components set forth in the following description or illustrated in the following drawings. The disclosure is capable of supporting other aspects and being practiced or being carried out in various ways. Also, it is to be understood that the phraseology and terminology used herein is for the purpose of description and should not be regarded as limiting. Terms of degree, such as "substantially," "about," "approximately," etc. are understood by those of ordinary skill to refer to reasonable ranges outside of the given value, for example, general tolerances associated with manufacturing, assembly, and use of the described aspects.

Figure 1:
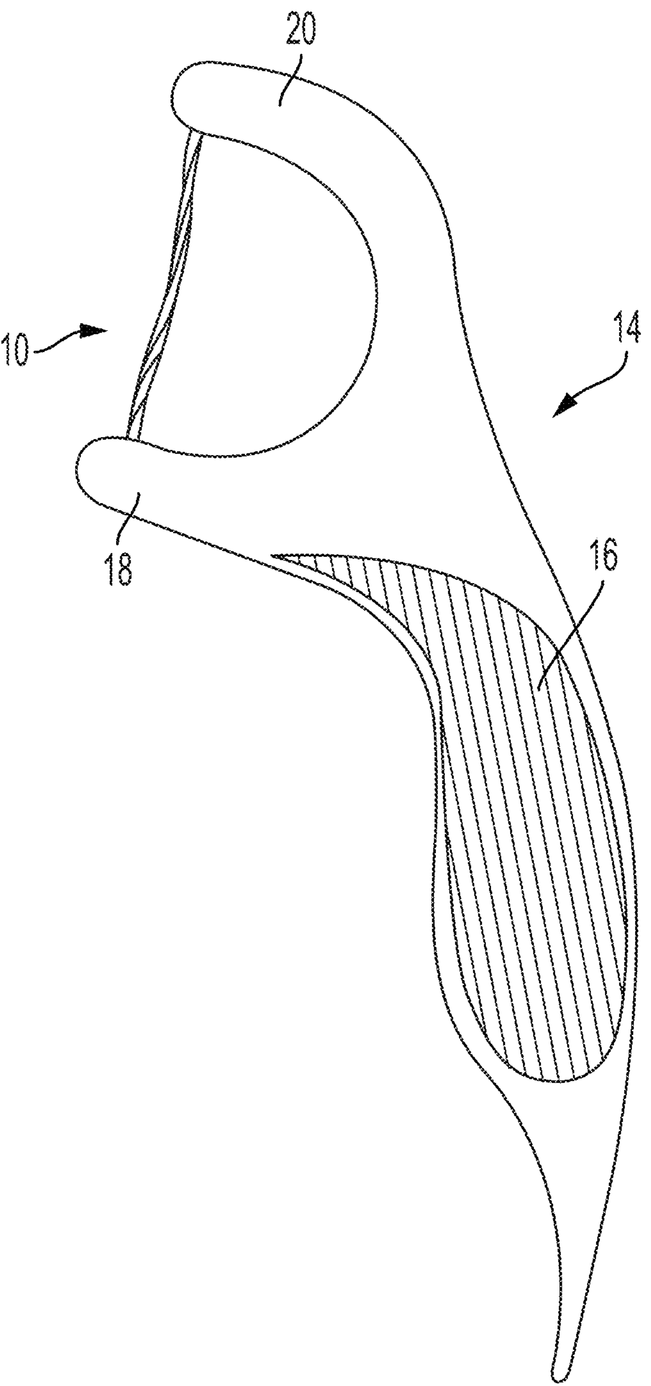
FIG. 1 is a perspective view of a flosser including a floss according to a first example.
Figure 2:
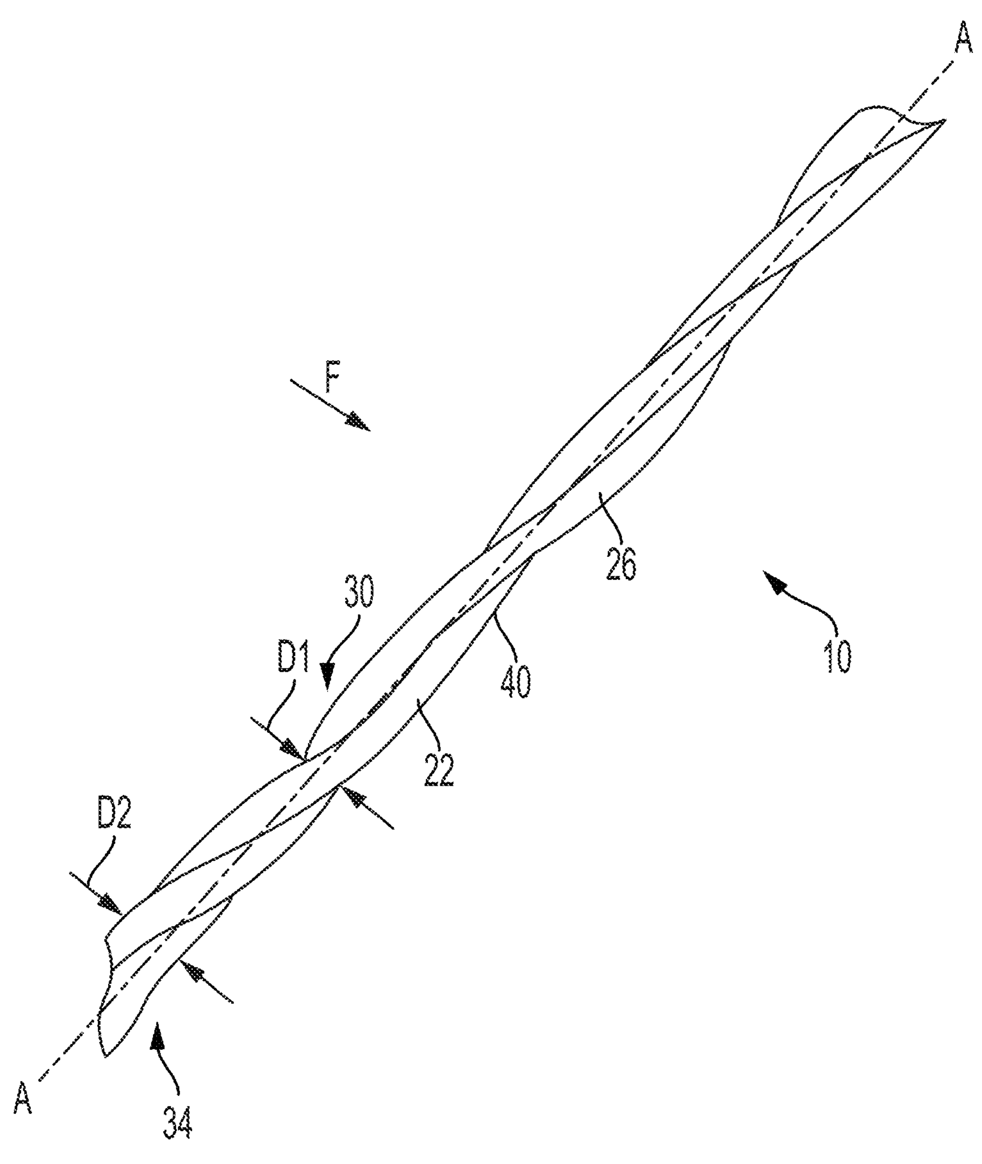
FIG. 2 is a detailed perspective view of the floss of FIG. 1.

FIGS. 1-2 illustrate a dental floss 10. The dental floss 10 may be coupled to a flosser 14 (FIG. 1) or may be dispensed from a dispenser (not shown). As shown in FIG. 1, the flosser 14 includes a body that has a handle 16, a first arm 18, and a second arm 20 that is spaced apart from the first arm 18. The dental floss 10 is coupled to and extends between the first arm 18 and the second arm 20. The dental floss 10 includes a dual-stranded member formed from a first strand of material 22 and a second strand of material 26 that is twisted with the first strand 22 (shown in detail in FIG. 2). The first and second strands 22, 26 are twisted along a longitudinal axis A of the dental floss 10. As used herein, the term "strand" refers to a plurality of fibers which may be woven together using any floss making process, and the term "filament" refers to a single fiber. Each of the first strand 22 and the second strand 26 may be formed using any suitable method. As used herein, the term twisted or twisting means to combine the first and second strands 22, 26 by winding or weaving together.

In one example, both the first strand 22 and the second strand 26 are formed from ultra high molecular weight polyethylene (UHMWPE). The first strand 22 includes about 182 filaments and has a fineness (e.g., thickness) value of 400 denier, and the second strand 26 includes about 132 filaments and has a fineness (e.g., thickness) value of 300 denier. The dental floss 10 has a total fineness (e.g., thickness) value of 700 denier. In other words, the first strand 22 makes up about 57% of the total thickness of the floss 10, while the second strand 26 makes up the remaining 43% of the total thickness of the floss 10. In other or alternative examples, the first strand 22 and the second strand 26 may have an appropriate number of filaments and fineness or thickness values such that the total fineness (e.g., thickness) value of the dual-stranded member may range from 400 denier to 1600 denier or more specifically, 440 denier to 1470 denier. The number of filaments and/or fineness of the first strand 22 may be equal to or different from the number of filaments and/or fineness of the second strand 26. Also, in alternative examples, the first strand 22 and the second strand 26 may each make up 50% of the total thickness of the floss 10. Alternatively, the first strand 22 may make up less than 50% of the total thickness of the floss 10 and the second strand 26 may make up greater than 50% of the total thickness of the floss 10. In still other alternative examples the first strand 22 may make up to 90% of the total strand thickness of the floss 10, while the second strand 26 may make up the remaining 10% of the total strand thickness of the floss 10. More specifically, the first strand 22 may make up 50% to 90% of the total strand thickness of the floss 10, while the second strand 26 may make up the remaining 10% to 50% of the total strand thickness of the floss 10. Moreover, the first strand 22 and the second strand 26 are twisted together with a twist density of between 180 twists/meter and 220 twists/meter, although other examples may have a twist density of between 60 twists/meter and 300 twists per meter. Although UHMWPE is used as the material for both the first strand 22 and the second strand 26, in other examples other materials may be used. Non-limiting examples of materials may include a polyamide (e.g., a Nylon), a polyethylene (e.g. UHMWPE), an elastomeric polymer, a thermoplastic polymer (e.g., polytetrafluoroethylene or "PTFE"), or a thermoplastic elastomer (TPE). Also, although in the illustrated example, both the first strand 22 and the second strand 26 are the same material, in other examples the first strand 22 and the second strand 26 may be different materials.

The dental floss 10 also includes alternating first and second sections 30, 34, as particularly illustrated in FIG. 2. The first sections 30 are relatively thick sections when measured perpendicular to the flossing direction F (e.g., into the page) and the second sections 34 are relatively thin sections when measured perpendicular to the flossing direction F (e.g., into the page). The first strand 22 and the second strand 26 are stacked in the first sections 30 such that the first sections 30 define a first dimension D1 (e.g., first width). The first strand 22 and the second strand 26 are aligned in the flossing direction in the second sections 34 such that the second sections 34 define a second dimension D2 (e.g., second width). The first and second dimensions D1, D2 are measured along the flossing direction F, which is perpendicular to the longitudinal axis A of the dental floss. The second dimension D2 is greater than the first dimension. For example, in the illustrated example, the first width D1 may measure at least 0.5 (e.g., the width of the first strand 22) mm while the second width D2 may measure at least 0.6 mm (e.g., the combined width of the first strand 22 and the second strand 26). In one example, the first width D1 may measure 0.54 mm while the second width D2 measure 0.63 mm.

The dental floss 10 may also include a coating 40 comprising a bonding agent (e.g., elvamide, and the like), a wax (e.g., Chinese beeswax, beeswax, liquid paraffin wax, sasol wax 8400, and the like), a sweetener and flavoring agent (e.g., neotame, acesulfame-K, spearmint oil, peppermint, mint oil, grape oil, grape powder, apple oil, apple powder, melon oil, melon powder, and the like), and a fluoride. The coating may also include water, an abrasive (e.g., sorbosil AC33 and the like), a coating formulation stabilizer (e.g., polyethylene glycol, xanthan gum, amylum, and the like), or any other suitable material (e.g., vitamin, alcohol and the like). In other examples, each of the strands 22, 26 is coating-less (i.e., does not have any coating).

The dental floss 10 of FIGS. 1-2 expands more than a comparative example dental floss A formed from a single strand (i.e., non-twisted) of UHMWPE and having 700 denier. When the dental floss 10 and the comparative example dental floss A were inserted between the narrowest space between adjacent teeth, both the dental floss 10 and the comparative example dental floss A realigned and flattened, which resulted in deformation. The dental floss 10 was able to go through the narrowest space more easily at least because the twisted nature of the dental floss 10 allows the first and second strands 22, 26 to realign along the flossing direction F causing both the first and the second strands 22, 26 to align side by side along the width in the flossing direction F, forming a structure like the second section 34. More specifically, prior to flossing, the width of the first section 30 of the dental floss 10 (that is, the first width D1) was 0.54 mm, and the width of the second section 34 of the dental floss 10 (that is, the second width D2) was 0.63 mm. After flossing, the width of the first section 30 and the width of the second section 34 were both 1.35 mm. Thus, for the first section 30 the ratio of post-flossing width to pre-flossing width was 2.50, and for the second section 34 the ratio of post-flossing width to pre-flossing width was 2.14. In contrast, the ability of the comparative example dental floss A to deform was more limited. Specifically, prior to flossing the comparative example dental floss A had a substantially circular cross-section of dimension 0.54 mm. After flossing, the comparative example dental floss A had a width of 0.82 mm and thus a ratio of post-flossing width to pre-flossing width of 1.58.

Without being bound to a single theory, it is hypothesized that the greater deformation of the dental floss 10 results in increased contact surface area of floss to the tooth surface and subsequently increased plaque removal. In one experiment, the depth of plaque removal was evaluated using a plaque Depth of Deposit Removal (DDR) assay in which a wet artificial plaque-covered pressure-sensitive substrate was placed over simulated posterior teeth and three floss products were evaluated for their ability to remove artificial plaque. The ability of the dental floss 10 to remove plaque was compared to the ability of a comparative example dental floss B and a comparative example dental floss C to remove plaque. The comparative example dental floss B was a single-stranded floss formed from UHMWPE and the second comparative example dental floss C was a single-stranded floss formed from monofilament PTFE. The assay used laboratory equipment described in "Access to Interproximal Tooth Surfaces by Different Bristle Designs and Stiffnesses of Toothbrushes," P Nygaard-Ostby et al. *Scand J Dent Res* 87: 424-430, 1979. The flossing technique involved independent evaluations of each floss sample in a vertical motion against tooth shapes simulating posterior teeth covered with an artificial plaque-covered pressure-sensitive substrate using weights of 50 g and 150 g. The testing apparatus was set to floss for 15 seconds at two strokes per second with a 5 mm stroke. Samples of each the dental floss 10, the comparative example dental floss B, and the comparative example dental floss C were tested twelve times. A rectangular-shaped attachment was constructed to position the floss on the simulated teeth, extending 60 degrees over the mesiobuccal and distobuccal line angles. Each sample of the dental floss 10, the comparative example dental floss B, and the comparative example dental floss C and artificial plaque surface were wetted with a 1:3 dilution of biotene gel to water for 15 seconds before testing was begun. See, "A Review of Laboratory Methods to Determine Toothbrush Safety and Efficacy." UP Saxer et al. *J Clin Dent* 8:114-119, 1997. The depth of plaque deposit removed was determined using a color comparative scale where a score of 0 represents no deposit removed and 4 indicates maximum removal. Results for all comparisons were statistically analyzed using an analysis of variance (ANOVA). A post hoc Tukey test for multiple pairwise comparisons with a significance level of 0.05 was used to determine if any mean values were significantly different, and T-tests assuming unequal variance were used to compare mean DDR for the same product under differing flossing pressures. The results are presented below in Table 1 and Table 2.

TABLE 1

| Depth of Plaque Removed at 50 g | |
|---|---|
| Floss Type | Mean (SD) |
| Dental Floss 10 | 0.96 (0.10) |
| Comparative Dental Floss B | 0.85 (0.08) |
| Comparative Dental Floss C | 0.27 (0.08) |

TABLE 2

| Depth of Plaque Removed at 150 g | |
|---|---|
| Floss Type | Mean (SD) |
| Dental Floss 10 | 1.11 (0.32) |
| Comparative Dental Floss B | 1.10 (0.21) |
| Comparative Dental Floss C | 0.36 (0.08) |

With respect to Table 1, the DDR mean of the dental floss 10 is significantly higher than the mean value removed by the comparative example dental floss B ($p<0.01$) and the comparative example dental floss C ($p<0.001$). The comparative example dental floss B has a significantly higher DDR mean than the comparative example dental floss C ($p<0.001$). With respect to Table 2, the DDR mean of the dental floss 10 and the comparative example dental floss B were significantly higher than the mean value for the comparative example dental floss C ($p<0.001$ for both), while the dental floss 10 and the comparative example dental floss B were not significantly different in efficacy at 150 g ($p>0.05$). Accordingly, the DDR assay indicates that the dental floss 10 is efficient at removing plaque, but requires less pressure.

Also, the two strands 22, 26 are capable of independently flossing and covering at least 40% more tooth surface than the comparative example dental floss B which consist of one strand. This is based on simple mathematical calculation which is explained here by assuming first and second strands 22, 26 in the floss 10 and floss strand of the comparative floss B are cylindrical strands with a circular cross section with diameter d. The diameter $d_b$ of the floss 10 when in the interproximal space is equal to the sum of the diameters of the first strand 22, $d_{b1}$, and the second strand 26, $d_{b2}$, while the diameter of the comparative example B is the diameter $d_a$ of the same. Accordingly, the diameter of the dental floss 10 is $d_b=d_{b1}+d_{b2}=2r_{b1}+2r_{b2}$, and $r_{b1}$ and $r_{b2}$ are the radii of the first strand 22 and the second strand 26, respectively. In one example, the first strand 22 and the second strand 26 are of the same denier, thus the same diameter $d_{b1}=d_{b2}$ and thus $r_{b1}=r_{b2}$. Therefore, $d_b=4r_{b1}$. Similarly, the diameter of the comparative example dental floss B is $d_a=2r_a$, twice its radius $r_a$. The floss 10 and the comparative example floss B are made of the same material and denier, they have the same density and thus the same volume. Therefore their cross-sectional areas are equal. If the diameters of the first strand and the second strand are the same ($r_{b1}$=to $r_{b2}$) then the area of the dental floss 10 is given below.

$$\text{Area} = \pi r_{b1}^2 + \pi r_{b2}^2 = 2\pi r_{b1}^2$$

And the area of the comparative example B is given below.

$$\text{Area} = \pi r_a^2$$

The cross-sectional areas of the dental floss 10 and the comparative example dental floss B are equal and therefore $$r_a^2 = 2r_{b1}^2$$

$$r_a = \sqrt{2}\, r_{b1}$$

$$d_b = \frac{4r_a}{\sqrt{2}}$$

$$d_b = \frac{2d_a}{\sqrt{2}}$$

$$d_b = 1.414 d_a$$

Assuming the flosses deform and shrink in the confinement directions without flattening to the side to expand (which is conservatively the case), the surface area that is in contact with the tooth surface is equal to the diameter multiplied by the contact length (i.e., $d_bL$ and $d_aL$), as shown below. Therefore, the ratio of the contact surface of the dental floss 10 to the contact surface of the comparative example B is give below.

$$\text{ratio} = \frac{d_b L}{d_a L} = 1.414$$

Conservatively, a contact surface of the floss 10 with the tooth surface is 1.414 times that of the comparative example floss B. And the increase in the contact surface area of the comparative example floss 10 is 41.4% compared to the comparative example dental floss B.

Figure 3:
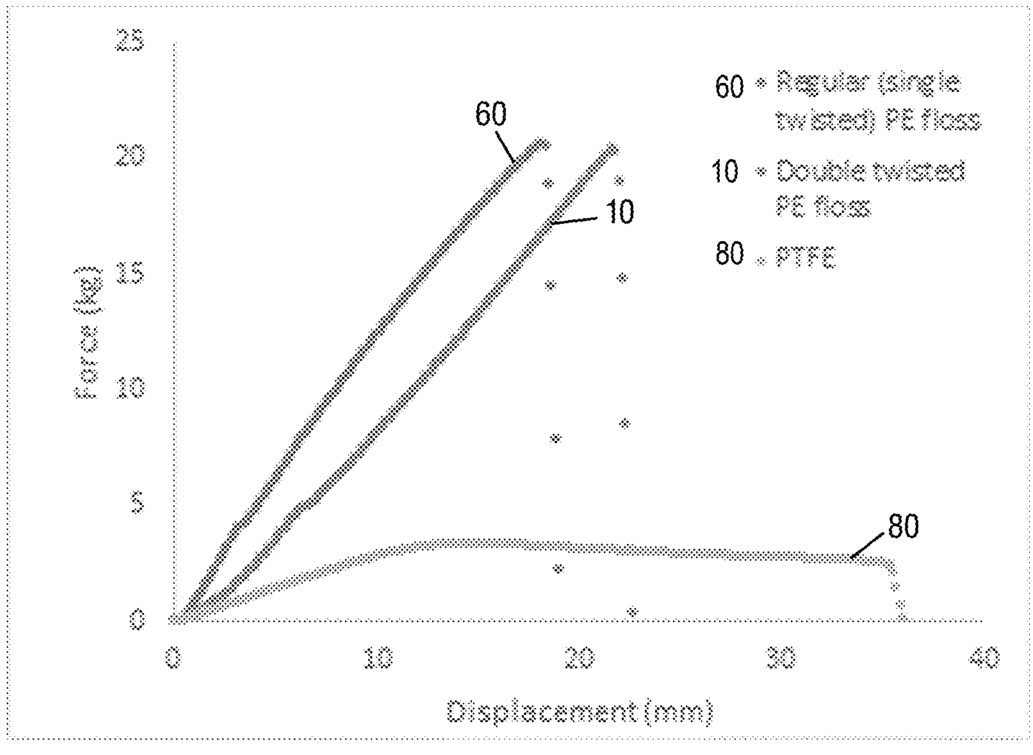
FIG. 3 illustrates the results of another experiment comparing the dental floss of FIGS. 1-2 to two comparative example dental flosses.

In addition to undergoing greater deformation, covering more tooth surface while flossing, and having the capability of removing more plaque, the dental floss 10 is at least as strong as (e.g., has comparable tensile strengths) and elongates to a longer length relative to comparative dental flosses. For example, the dental floss 10 is at least as strong as the comparative example dental floss B (represented by reference numeral 60 in FIG. 3) formed of single-stranded UHMWPE, and elongates to a longer length until it breaks than the comparative example floss B. For another example, the dental floss 10 is at least as strong a comparative example dental floss D (represented by reference numeral 80 in FIG. 3), which is a monofilament floss formed of PTFE, and elongates to a longer length until it breaks than the comparative example dental floss D. Evidence of these conclusions is shown in FIG. 3, which illustrates a tensile test comparing the dental floss 10, the comparative example dental floss B, and the second comparative dental floss D. As shown, the dental floss 10 and the comparative example dental floss B are much stronger (e.g., have much higher tensile strengths) than the comparative example dental floss D. Also, elongation of the dental floss 10 was about 21.7%, while the elongation of the comparative example dental floss B was about 18.2%.

A method of manufacturing a dental floss includes twisting a first strand of material and a second strand of material together at a twist density of between 60 twists/meter to 300 twists/meter, and twisting the first strand and the second strand includes forming alternating first sections that have a first width in a flossing direction and second sections having a second width in the flossing direction that is greater than the first width. The method may or may not include covering each of the first strand and the second strand with a coating.

Although the disclosure has been described in detail with reference to certain preferred aspects, variations and modifications exist within the scope and spirit of one or more independent aspects of the disclosure as described. Various features and advantages of the disclosure are set forth in the following claims.

What is claimed is:

1. A dental floss comprising:

a first cylindrical strand of material twisted with a second cylindrical strand of material at a twist density of between 60 twists/meter to 300 twists/meter, inclusive; and the first cylindrical strand of material comprising a plurality of woven first fibers;

the second cylindrical strand of material comprising a plurality of woven second fibers;

wherein a total thickness of the dental floss is between 400 denier and 1600 denier.

2. The dental floss of claim 1, wherein the material of the first cylindrical strand and the second cylindrical strand are different.

3. The dental floss of claim 1, wherein the material of the first cylindrical strand and the second cylindrical strand is the same.

4. The dental floss of claim 1, further comprising a coating covering each of the first cylindrical strand and the second cylindrical strand.

5. The dental floss of claim 1, wherein no coating covers the first cylindrical strand and the second cylindrical strand.

6. The dental floss of claim 1, wherein the material of the first cylindrical strand and the second cylindrical strand is at least one selected from the group consisting of a polyamide, a polyethylene, an elastomeric polymer, a thermoplastic polymer, or a thermoplastic.

7. The dental floss of claim 1, wherein the first cylindrical strand has a thickness equal to 50% of the total thickness and the second cylindrical strand has a thickness equal to 50% of the total thickness.

8. The dental floss of claim 1, wherein the first cylindrical strand has a thickness less than 50% of the total thickness and the second cylindrical strand has a thickness greater than 50% of the total thickness.

9. The dental floss of claim 1, wherein the first cylindrical strand of material and the second cylindrical strand of material have a total thickness, a thickness of the first cylindrical strand of material being 10% to 50% of the total thickness and a thickness of the second cylindrical strand being 90% to 50% of the total thickness.

10. The dental floss of claim 1, wherein the twist density is between 180 twists/meter to 220 twists/meter, inclusive.

11. The dental floss of claim 1, wherein the floss has alternating first sections and second sections, the second sections having a greater width in a flossing direction than the first sections.

12. The dental floss of claim 11, wherein a width of the first sections is 0.5 mm to 0.54 mm; and wherein a width of the second sections is 0.6 mm to 0.63 mm.

13. The dental floss of claim 1, wherein the first cylindrical strand of material has a thickness of about 400 denier; and wherein the second cylindrical strand of material has a thickness of about 300 denier.

14. A flosser comprising:

a body including a handle, a first arm, and a second arm spaced apart from the first arm; and a dental floss coupled to and extending between the first arm and the second arm, the dental floss including a first strand of material twisted with a second strand of material at a twist density of between 60 twists/meter to 300 twists/meter, inclusive;

the first strand of material having a circular cross section and the second strand of material having a circular cross section; and the first strand of material comprising a plurality of woven first fibers;

the second strand of material comprising a plurality of woven second fibers;

wherein a total thickness of the dental floss is between 400 denier and 1600 denier, inclusive.

15. The flosser of claim 14, wherein the material of the first strand and the second strand is at least one selected from the group consisting of polyamide, polyethylene, elastomeric polymer, thermoplastic polymer, thermoplastic elastomer, or polytetrafluoroethylene (PTFE).

16. The flosser of claim 14, wherein the first strand has a thickness equal to 50% of the total thickness and the second strand has a thickness equal to 50% of the total thickness.

17. The flosser of claim 14, wherein the first strand has a thickness less than 50% of the total thickness and the second strand has a thickness greater than 50% of the total thickness.

18. The flosser of claim 14, wherein the twist density is between 180 twists/meter to 220 twists/meter, inclusive.

19. The flosser of claim 14, wherein the dental floss has alternating first sections and second sections, the second sections having a greater width in a flossing direction than the first sections.

20. A method of manufacturing a dental floss, the method comprising:

twisting a first cylindrical strand of material and a second cylindrical strand of material together at a twist density of between 60 twists/meter to 300 twists/meter, inclusive;

the first cylindrical strand of material having a circular cross section and the second cylindrical strand of material having a circular cross section; and the first cylindrical strand of material comprising a plurality of woven first fibers;

the second cylindrical strand of material comprising a plurality of woven second fibers;

wherein a total thickness of the dental floss is between 400 denier and 1600 denier, inclusive.

* * * * *